(12) United States Patent
Heitz

(10) Patent No.: US 6,491,998 B1
(45) Date of Patent: Dec. 10, 2002

(54) WET CLEANING CLOTH

(75) Inventor: Rosita Heitz, Filderstadt (DE)

(73) Assignee: Pathol Limited, St. Helier, NJ (US)

( * ) Notice: Subject to any disclaimer, the term of this patent is extended or adjusted under 35 U.S.C. 154(b) by 848 days.

(21) Appl. No.: 08/975,802

(22) Filed: Nov. 21, 1997

Related U.S. Application Data

(63) Continuation of application No. 08/575,553, filed on Dec. 20, 1995, now abandoned.

(51) Int. Cl.[7] .............................. A47L 1/06; B32B 5/08; B32B 33/00
(52) U.S. Cl. .............................. 428/92; 428/88; 15/208; 15/209.1; 15/210.1
(58) Field of Search .......................... 428/92; 15/207.2, 15/208, 209.1, 210.1, 229.1, 229.11, 236.03, DIG. 5, DIG. 6

(56) References Cited

U.S. PATENT DOCUMENTS

| | | | | |
|---|---|---|---|---|
| 3,215,584 A | * | 11/1965 | McConnell et al. | 15/209.1 |
| 3,384,918 A | * | 5/1968 | Fink | 428/86 |
| 3,414,928 A | * | 12/1968 | Lemelson | 15/229.11 |
| 3,605,347 A | * | 9/1971 | Barry | 15/207.2 |
| 3,626,509 A | | 12/1971 | Rones | |
| 3,638,270 A | | 2/1972 | Schlegel, Jr. et al. | |
| 3,827,099 A | | 8/1974 | Allaire et al. | |
| 3,924,289 A | * | 12/1975 | Richards | 15/209.1 |
| 4,246,308 A | * | 1/1981 | Walsh | 428/92 |
| 4,361,922 A | * | 12/1982 | Karal | 15/DIG. 6 |
| 4,671,976 A | * | 6/1987 | Vidal | 428/92 |
| 4,703,538 A | * | 11/1987 | Silverstrone | 15/207.2 |
| 5,377,378 A | * | 1/1995 | Cutler | 15/DIG. 5 |
| 5,419,015 A | * | 5/1995 | Garcia | 15/209.1 |
| 5,525,393 A | * | 6/1996 | Raab | 428/92 |

FOREIGN PATENT DOCUMENTS

| | | |
|---|---|---|
| DE | 3926524 | 2/1991 |
| DE | 93015348 | 5/1993 |
| EP | 0468301 | 1/1992 |
| JP | 3159627 | 7/1991 |
| JP | 4096724 | 3/1992 |
| WO | WO9014039 | 11/1990 |

* cited by examiner

*Primary Examiner*—Cheryl A. Juska
(74) *Attorney, Agent, or Firm*—Harness, Dickey & Pierce, P.L.C.

(57) ABSTRACT

A wet cleaning cloth for cleaning stoneware areas has a textile carrier, with individual unbundled elastic fibres in a range from 1,000 to 2,000 per square centimeter extend from one side of said textile carrier. Said individual fibres are arranged at a certain distance from each other and extend with a length range of 2 to 12 mm from said carrier, said fibres having a free end with a sharp edge.

10 Claims, 2 Drawing Sheets

WET CLEANING CLOTH

Figure 1:
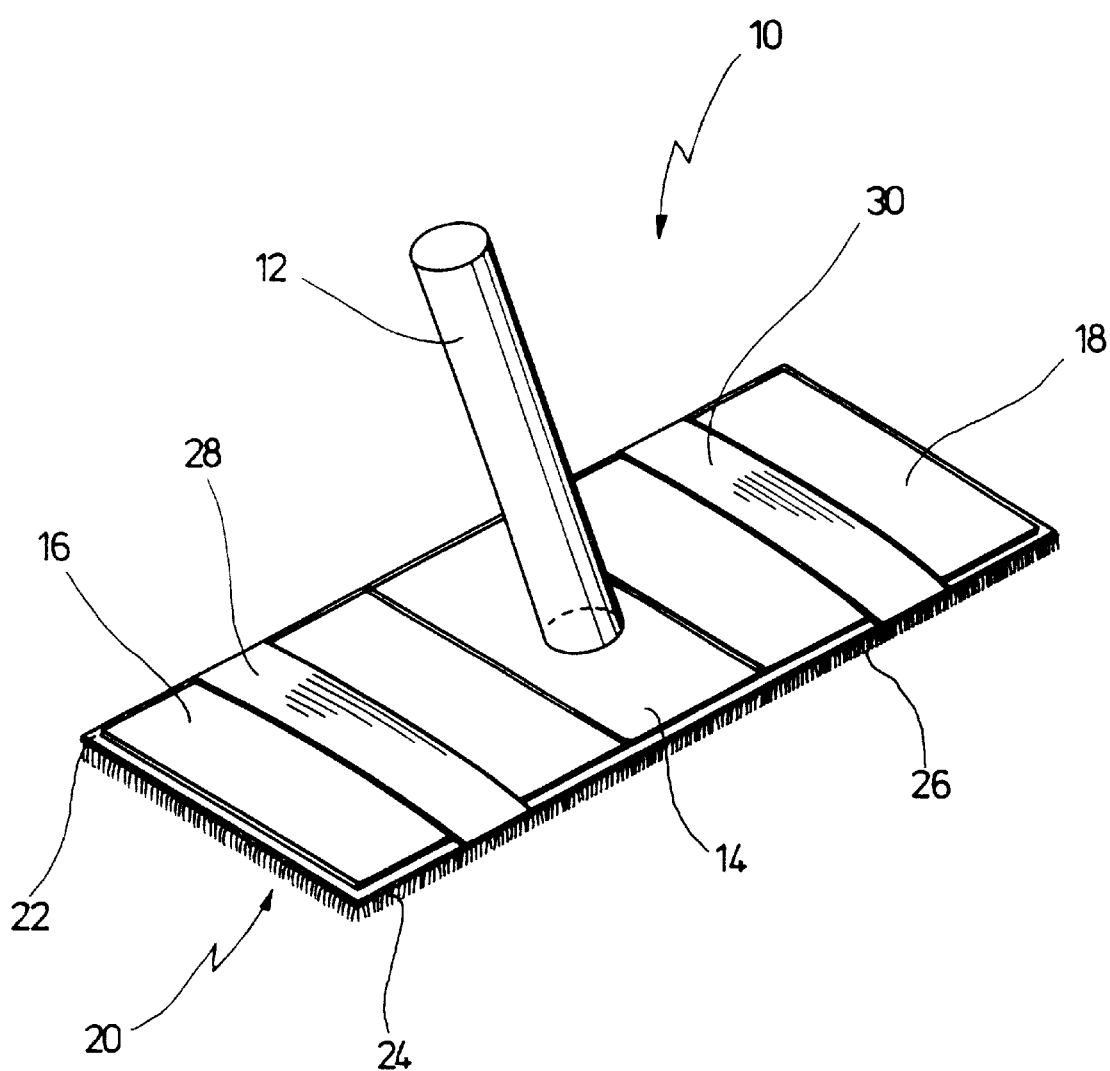

This is a continuation of U.S. patent application Ser. No. 08/575,553, filed Dec. 20, 1995 now abandoned.

The present invention relates to a wet cleaning cloth for cleaning porous stoneware areas.

Wet cleaning cloths for cleaning porous stoneware areas are known of mop-type design in which cord-like structures extend 10 to 15 cm from a carrier. The cord-like structures themselves are made of individually twisted or cabled cords. It is known that cloths of this nature are used as covers for cleaning devices to clean porous stoneware areas.

The disadvantage of such a design is that porous stoneware areas can not be cleaned adequately with such cloths.

Porous stoneware areas are understood to be, for example, non-glazed natural stone floors, which have small pores in the surface as a result of the manufacturing process. These pores may also be grooves which have been produced, for example, by the grinding or cutting processes during the manufacture of such flooring.

Porous stoneware areas are also understood to be ceramic tiles which have been manufactured or subsequently processed in such a way as to produce a porous surface. Cast stone floors may also have a fine porous surface depending on the manufacturing method. So-called fine stoneware may also have a porous surface. The size of the pores is very small, measuring millimeters or fractions of millimeters.

Such floors are in wide use in public buildings or in commercially used buildings such as banks, factory halls or similar which are usually subject to maintenance cleaning, mostly on a daily basis.

It is not possible to adequately clean porous stoneware areas with the mop-like wet cleaning cloths mentioned above. An attempt was therefore made to improve the cleaning result by adding chemicals to the cleaning water.

The improvement achieved was negligible since it was discovered that the chemical additives attack the stoneware areas over the course of time and also tend to clog the pores instead of cleaning them.

German laid open application DE-OS 39 26 524 discloses a cleaning device with a cloth bonded to an absorbing body. The cloth is plushlike and contains bundles of fibers each with approximately ten individual fibers which are bent in U-shape and bonded to the base fabric by means of latex. The bundles bent in a U-shape are arranged in such a way that the two arms of the U project away from the base fabric, creating two bundles with free ends. The base fabric is made of approximately 100 to 150 fiber bundles per square centimeter, thus providing about 200 to 300 free ends of fiber bundles. Each bundle is made up of approximately ten individual fibers so that, on average, there are roughly 2,000 to 3,000 fibers per square centimeter. However, due to the fact that ten fibers are brought together in a bundle, a bundle of this nature is to be considered as a single operating "bundled fiber". During a cleaning process one bundle works like one thick fiber since the ten individual fibers are disposed very close together. For this reason only about 200 to 300 fibers are in operation, effectively i.e. the respective fiber bundles.

European Patent Application EP-0 468 301 discloses a device for cleaning surfaces with fiber pieces made of plastic attached to a planar carrier. One end of the plastic fibers is attached to the carrier, leaving the other end projecting freely from one side of the carrier. A structure made of absorbing and wipe-resistant material is attached to the other side of the carrier facing away from the fiber pieces. The fibers have a fineness of 5 to 30 dtex and project 4 to 35 mm from the carrier. The fibers are made of polyester.

From WO 90/14 039 a cleaning cloth is known onto which cloth a non-woven fabric is attached in several zigzag patterns arranged side by side. There is no non-woven fabric present between the zigzag patterns.

It is object of the present invention to provide a wet cleaning cloth with which porous stoneware areas can be cleaned simply and effectively.

According to the invention a wet cleaning cloth for cleaning stoneware areas having pores in its surface comprises a textile carrier having individual unbundled elastic fibers extending from one side of said textile carrier, said individual fibers are arranged at a certain distance from each other for avoiding bunches of fibers, the number of said fibers per square centimeter ranges from 1,000 to 2,600, said fibers extend from said carrier with a length ranging from 2 to 12 mm, and said fibers have free ends with a sharp edge resulting from a cutting treatment for cutting said fibers to said length.

It was found that with such fibers an excellent cleaning result on porous stoneware areas is achievable. The individual fine fibers can penetrate into the fine pores and "scratch out" the dirt particles in these fine pores. The fine fibers, in particular those made of plastic material, have, within the selected length range of 2 to 12 mm, a particular elasticity, which enables such a cloth to tolerate the pressures usually acting on the cloth during cleaning processes with slight deformation or bending of the individual fibers so that the free ends of the fibers dislodge and absorb dirt as they pass over the smooth stoneware areas. Deformed or bent fibers reaching an area with pores will relax as a result of their elasticity or rigidity, enter the pores and "scratch out" even the finest particles from them. The sharp edge end enhances the scratching process. This mechanical process renders chemical cleaning agents dispensable under normal circumstances, i.e. it is completely sufficient to clean such floors with water and without chemical additives. The fibers may be made of plastic fibers or be a mixed fabric whereby the proportion of plastic fibers in relation to natural fibers (e.g. cotton) predominates.

It was furthermore found out that the dirt particles attached to the fibers are gradually transported in the direction of the textile carrier away from the area to be cleaned by means of the water wetting the surface of the individual fibers and as a result of the movement of the fibers as they deform and relax. This process is possible for each individual fiber due to the certain distance among each other, leaving sufficient space for a deformation and relaxation movement of each individual fiber. This causes the dirt particles to be gradually moved towards the carrier. The dirt particles removed from the stoneware collect here. This is something which is very easy to recognize. The dirt particles can then be removed simply by washing out the wet cleaning cloth. In order to achieve excellent cleaning results on porous stoneware areas it is sufficient to merely moisten the wet cleaning cloth and not to have it wringing wet.

With that advantage not only chemical additives can be dispensed during daily maintenance cleaning but also considerably less water is required, i.e. that the quantities of dirty cleaning water to be disposed of are smaller amount. In addition, the absence of chemical additives has the enormous advantage that the durability of the surface subjected to daily maintenance cleaning is considerably increased. Should the floor be very dirty or be soiled with dirt which is not water-soluble, as in car showrooms with tire marks or an oily film, chemical additives can, of course, be added to the cleaning water.

The wet cleaning cloths have a very long serviceable life, particularly if water alone is used, since the fibers themselves do not form an insoluble bond either with the water or with the particles of dirt.

In an embodiment of the invention the fibers extend in a range between 4 to 10 mm from the carrier, and extend in particular 6 mm.

These fiber lengths have proved to be particularly advantageous for the usual floors in buildings, i.e. particularly good results can be achieved with these lengths.

In a further embodiment of the invention fibers in the range from 1,400 to 2,200 per square centimeter, in particular 1,800 fibers per square centimeter are present.

Particularly good results can be achieved with this fiber number or density whereby the selection can depend on the size and the number of pores present in the stoneware areas to be cleaned.

In a further embodiment of the invention the fibers are polyester fibers.

The use of polyester fibers has the considerable advantage that even when wet, these fibers have a substantial affinity to dirt and fat particles which mean that such particles adhere to the fibers. The deformation/bending and relaxation of the individual fibers during cleaning, coupled with the existing water film, causes the dirt particles adhering to the polyester fibers to be transported particularly quickly in the direction of the carrier and to be collected here. Fibers made of polyester have a high mechanical stability and a sufficient elasticity so that the fine fiber pile can bear substantial pressure during cleaning and the fibers are nevertheless able to relax into the pores and dislodge dirt particles solely by mechanical means.

In a further embodiment of the invention the carrier is also made of polyester.

This measure has the advantage that not only the manufacturing of the wet cleaning cloth as a fabric is rendered easier, but that the dirt particles which can be removed using water alone are collected very well in the textile planar carrier made of polyester and can be washed out very easily.

In a particular embodiment of the invention the sharp edge at the free end of each fiber runs at an angle to the longitudinal axis of a fiber.

This has the advantage that a particularly sharp edge is obtained by slanting the edge along the longitudinal axis of a fiber, thus making it easier to scratch out dirt from the pores.

Preferably the fibers are cylindrical.

This has the advantage that the cylindrical geometry produces very elastic and mechanically stable fibers which provide for a long serviceable life in addition to an excellent cleaning result. The cylindrical fibers have identical bending characteristics in every working direction so that identical cleaning results can always be achieved irrespective of the cleaning direction. It is possible to use the wet cleaning cloth as a "pad disc" on rotating cleaning devices.

In a further embodiment of the invention the fibers are pre-bent, particularly in an undulating form.

This has the considerable advantage that when the wet cleaning cloth is guided over the floor the fibers bend in a defined manner as a result of the pre-bending of the fibers during manufacture. This means that the fibers can be arranged relatively close together, but will not touch each other during a defined bend if, for example, all fibers bend or extend in the same direction in one area of the wet cleaning cloth. This means that each individual fiber can contribute, freely and without hindrance from adjacent fibers, to the transportation of the dirt particles adhering to it in the direction of the carrier by means of periodical relaxation and bending. This contributes to a substantial dirt absorption capacity of the wet cleaning cloth as a whole, whereby the dirt particles taken up in the free end area of a fiber can be transported quickly in the direction of the carrier during the same cleaning process, leaving the ends of the fiber free again to absorb more particles.

A cleaning cloth of the invention can be used as a cover for cleaning devices or as a hand-held cleaning cloth.

In particular, especially for use in maintenance cleaning of commercially used rooms such as offices or exhibition areas, the wet cleaning cloth measures 50×13 cm.

Using known cleaning devices and with the usual working pressures and usual handling, an excellent cleaning result can be achieved with this size of a wet cleaning cloth and with the fine-fiber pile of plastic fibers.

It has emerged that a wet cleaning cloth in the size of 40×13 cm or 40×11 cm produces excellent cleaning results in the maintenance cleaning of very fine stoneware areas, particularly in private households.

This size permits an optimum cleaning result to be achieved by a housewife with a hand-held cleaning device in one cleaning cycle, assuming the usual working pressure.

It is clear that the afore mentioned and following features can not only be implemented in the specified combinations but also in other combinations and alone without exceeding the scope of the invention.

The invention will be described and explained more closely in the following using a few selected embodiments.

Figure 2:
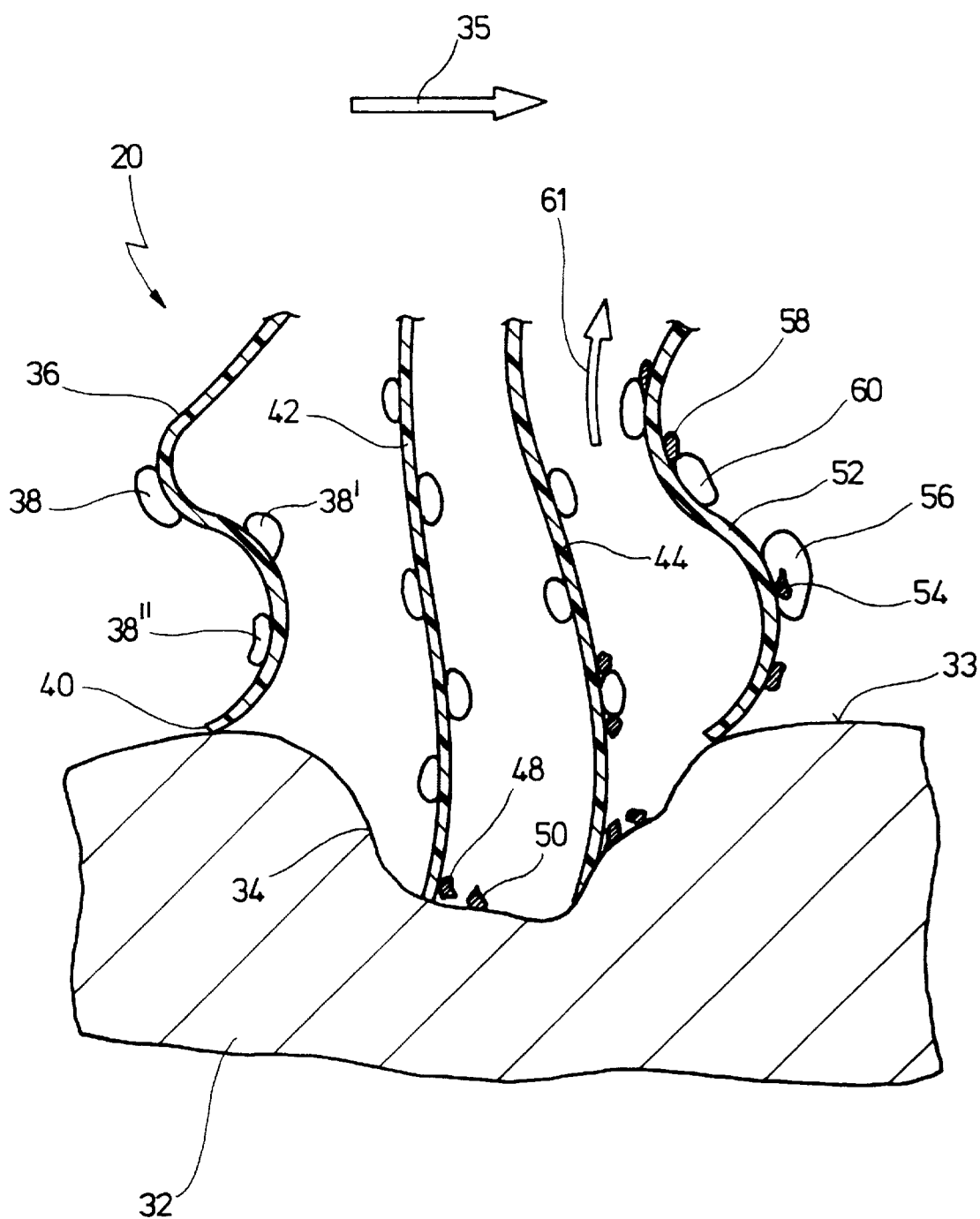

FIG. 1 shows a schematic perspective view of a cleaning device having a cover in the form of a wet cleaning cloth according to the present invention, and FIG. 2 shows a very enlarged section near the free ends of the fibers of a wet cleaning cloth according to the invention during cleaning of a porous stoneware area.

A cleaning device 10 comprises a stick 12 for handling the device 10 by hand.

At the bottom end of the stick 12 there is a multipart carrier plate 14 having side wings 16 and 18.

A wet cleaning cloth 20 is attached to the underside of the carrier plate 14 which underside is opposite to the stick 12.

The wet cleaning cloth 20 has a textile planar carrier 22 made of polyester material.

A pile 24 of fibers 26 projects at right angles from the carrier 22.

On one side of the carrier 22 opposite to the pile 24, bands 28 and 30 are provided which extend across the shorter sides of the rectangular carrier 22. For attaching the wet cleaning cloth 20 to the carrier plate 14, the side wings 16 and 18, respectively, are inserted between bands 28 and 30, respectively, and the carrier 22.

The side wings 16, 18 can be moved downwardly in the direction away from the stick 12 via a mechanism (not shown here) for facilitating the attaching of the wet cleaning cloth 20 to the carrier plate 14.

As can be seen from the perspective view in FIG. 1, the size of the carrier plate 14 approximately corresponds to the size of the carrier 22 so that the wet cleaning cloth 20 fits tightly on the carrier plate 14.

The embodiment shown in FIG. 1 features a wet cleaning cloth 20 having a size of 50×13 cm. The fibers 26 extending from the carrier 22 have a length of 6 mm and about 1,800 fibers per square centimeter are present.

Depending on field of use, i.e. depending on the nature of the cleaning device and the surface of the stoneware to be cleaned, the fibers 26 length ranges between 4 and 10 mm; usually at least 2 mm long for particularly fine pored floors and up to 12 mm for particularly deep pored stoneware areas.

The fiber fineness ranges from 1 to 100 dtex and the fibers 26 are made of a polyester.

The carrier 22 consists of a textile material made of polyester. The wet cleaning cloth 20 weighs around 540 g per square meter.

In order to give the carrier a certain degree of rigidity it is reinforced, for example by a resin.

The shape and the size of the wet cleaning cloth 20 will depend on the respective area of use and on the cleaning device to which it is to be attached. Typical sizes are 50×13 cm, 40×13 cm or 40×11 cm.

The wet cleaning cloth 20 may also take the form of a "pad disc" for use on a rotating cleaning device.

The wet cleaning cloth 20 may also take the form of a hand-held wet cleaning cloth, i.e. may be used without the assistance of cleaning devices 10.

The mode of operation of the wet cleaning cloth 20 will be explained in more detail in connection with FIG. 2.

A floor 32, for example a non-glazed natural stone floor, has numerous pores 34 in the surface 33.

The pores 34 result either from the natural stone material itself or are the result of processing of the surface 33 by cutting or grinding.

The pore sizes are fractions of millimeters.

For cleaning purposes a wet cleaning cloth 20 in accordance with the invention, which is, for example, attached to the cleaning device 10 shown in FIG. 1, is brought into contact with some water as to be moist but not wringing wet.

The moisture adheres to the surface of the individual fibers as shown in FIG. 2, for example, by the water droplets 38, 38', 38" on fiber 36.

When the wet cleaning cloth 20 is moved over the surface 33, as indicated in FIG. 2 by an arrow 35, the individual fibers are deformed or bent as a result of the exerted pressure. The fibers may bend or undulate as shown by fiber 36.

This bending is made easier and performed in a predetermined direction by pre-bending the fibers during manufacturing, and in particular by undulating them, as shown in fiber 42. Due to the fact that the individual fibers are arranged at a certain distance from each other, a "bent or taut" fiber does not touch an adjacent one.

When a bent fiber reaches a pore 34, it expands shot-like into the pore 34 and relaxes, as it is shown with fibers 42 and 44.

Due to the fact that the fibers are cut off at the free end, they have a sharp edge 40, as indicated by fiber 36. Dirt particles 48 and 50 can be scratched out of the pore 34 by the fibers 42 and 44, whereby the fine fibers 42 and 44 pass over very small, also microscopic unevenness of the pore 34 and remove the appropriate dirt particles 48, 50.

In order to enhance the scratching effect of the edge 40, the edge can be made to run at a slanting angle to the center longitudinal axis of fiber 36, as shown with fiber 44.

As a result of the subsequent deformation, coupled with the subsequent cleaning movement, the dirt particles move in the direction of the carrier 22 in interaction with the moisture, as demonstrated by an arrow 61 in FIG. 2.

It can be seen in FIG. 2 that a dirt particle 54 is captured in a moisture droplet 56, for example, which is gradually being transported in the direction of the carrier 22 as a result of the tensioning/relaxing movement of the fibers.

Similarly, it is possible for a moisture droplet 60 to push a dirt particle 58 in front of it in the direction of the carrier 22.

The particular movement of the dirt particles will depend on the nature of the dirt particles, i.e. whether they are wetted by water or not.

As a result of the afore mentioned certain distance between the individual fibers, which is approximately equidistant, the dirt particles 54, 58 of an individual fiber 52 can be moved upwardly unhindered by adjacent fibers.

The dirt particles collected at the carrier 22 can simply be washed out of the material so that the wet cleaning cloth 20 is immediately available for a new cleaning job.

What is claimed is:

1. Wet cleaning cloth for cleaning stoneware areas having pores in its surface, said cloth comprises:

a textile carrier having individual unbundled elastic fibers extending from one side of said textile carrier, said individual fibers are arranged at a distance from each other for avoiding bunching of the fibers, the number of said fibers per square centimeter ranges from 1,000 to 2,600, said fibers extend from said carrier with a length ranging from 2 to 12 mm, and said fibers have free ends with a sharp edge resulting from a cutting treatment for cutting said fibers to said length.

2. Wet cleaning cloth of claim 1, wherein the fiber length is in the range between 4 to 10 mm.

3. Wet cleaning cloth of claim 1, wherein the fiber length is approximately 6 mm.

4. Wet cleaning cloth of claim 1, wherein the number of fibers ranges from 1,400 to 2,200 per square centimeter.

5. Wet cleaning cloth of claim 1, wherein approximately 1,800 fibers per square centimeter are present.

6. Wet cleaning cloth of claim 1, wherein the fibers are made of polyester.

7. Wet cleaning cloth of claim 1, wherein the textile carrier is made of a polyester material.

8. Wet cleaning cloth of claim 1, wherein a terminal surface resulting from said cutting treatment runs at a slanting angle with respect to the longitudinal axis of the fiber.

9. Wet cleaning cloth of claim 1, wherein the fibers are circular in cross-section.

10. Wet cleaning cloth of claim 1, wherein the fibers, are pre-bent in an undulating form.

* * * * *

UNITED STATES PATENT AND TRADEMARK OFFICE
CERTIFICATE OF CORRECTION

PATENT NO. : 6,491,998
DATED : December 10, 2002
INVENTOR(S) : Rosita Heitz

It is certified that error appears in the above-identified patent and that said Letters Patent is hereby corrected as shown below:

<u>Title page,</u>
Item [73], Assignee, "NJ (US)" should be -- Jersey (UK) --.
Item [57], ABSTRACT,
Lines 2, 4 and 7, "fibres" should be -- fibers --.

Signed and Sealed this

Twenty-eighth Day of October, 2003

JAMES E. ROGAN
*Director of the United States Patent and Trademark Office*